United States Patent Office.

EDWARD E. ALVORD, OF SALT RIVER, MICHIGAN.

Letters Patent No. 111,602, dated February 7, 1871.

---

IMPROVEMENT IN COATING BRICK, WOOD, AND OTHER SURFACES ON WALLS, &c.

The Schedule referred to in these Letters Patent and making part of the same.

---

*To all whom it may concern:*

Be it known that I, EDWARD E. ALVORD, of Salt River, county of Isabella and State of Michigan, have invented a new and improved process for the manufacture and production of Cement to be applied to Stone, Brick, or Wooden Surfaces of Buildings, both external or internal, and that may also be applied to any wooden surface, such as board fences, or other similar material where it may be desirable to furnish a water and fire-proof surface, of which the following is the specification.

In the application of the first coat to brick or wooden surfaces, I make and prepare, in equal parts, stone-lime, slaked dry and sifted, and common salt, adding thereto a sufficient quantity of water to make the plaster or cement of the proper consistency to be spread upon the stone, brick, or wooden surface with a trowel or other suitable implement.

For the second coat I take equal parts of stone-lime slaked, dried, and sifted, and salt and sand sifted, adding sufficicient water thereto and for the purposes described in the production of the first coat.

For the third coat I take two parts plaster Paris and one part sifted sand, adding water thereto for the purposes described in the preparation of the first two coats.

The last preparation constituting a finished surface, I do not confine myself to the exact proportions above specified; for it is obvious that a change could be made therein producing similar results, although I conceive those described by me are better adapted to and for the purposes designed.

What I claim as my invention, and desire to secure by Letters Patent, is—

The method herein described for the coating of brick, wood, or other surfaces, with cement or plaster prepared and made by the process and substantially in the proportions herein specified.

EDWARD E. ALVORD.

Witnesses:
E. A. BARNARD,
H. M. BARNARD.